3,793,275
HARD SURFACE POLISHES

Garland G. Corey, Milltown, and Francis S. Csorba, Westfield, N.J., Karl A. Torok, New York, N.Y., and Bernard Weinstein, North Plainfield, N.J., assignors to American Home Products Corporation, New York, N.Y.
No Drawing. Filed Oct. 1, 1971, Ser. No. 185,799
Int. Cl. C08f 45/52
U.S. Cl. 260—28.5 R                                    8 Claims

ABSTRACT OF THE DISCLOSURE

Hard surface cleaning and/or polishing compositions are described which contain a halogenated hydroxy-diphenyl ether that provides excellent residual anti-microbial action on a substrate-coated with a cleaning and/or polishing composition containing such a material.

---

This invention related to hard surface cleaning and/or polishing compositions containing a halogenated hydroxy-diphenyl ether.

The utilization of an anti-microbial agent in a hard surface polish or cleaning composition such as a floor polish, is not new. Such compositions have generally suffered from one or more drawbacks because the anti-microbial agent (1) interfered with or decreased important quality characteristics such as gloss (2) detracted from product stability by causing separation or precipitation of ingredients in the emulsion (3) resulted in a toxicity level that caused irritation upon contact with the skin (e.g. child crawling over waxed floor containing anti-microbial agent) and (4) provided effective action over only a short duration; in other words washing of the waxed floor or heavy foot traffic rapidly caused a decrease or total loss in anti-microbial action.

Accordingly, one aspect of the present invention is to provide a hard surface polishing and/or cleaning composition that retains its anti-microbial action over a long period after application.

Another aspect of the present invention is to provide floor polish and floor care compositions that do not detract from the quality characteristics desired in such a composition, does not interfere with product stability and has a low order of toxicity so as not to cause any irritation.

A still further aspect of the present invention is to provide an acrylic based clear floor polish composition containing a halogenated hydroxy-diphenyl ether as an anti-microbial agent.

An additional aspect of the present invention is to provide a hard surface polishing and/or cleaning composition containing an anti-microbial effective amount of 2,4,4'-trichloro-2'-hydroxy-diphenyl ether.

These and other aspects of the present invention will become apparent from the following description.

The products of the present invention comprise hard surface polishing and/or cleaning compositions, preferably a floor polishing and/or cleaning composition, containing an anti-microbial agent. The anti-microbial agents used in the hard surface compositions of the present invention are known prior art compounds. These compounds, their preparation and properties are described in U.S. Pat. 3,506,720, the disclosure of which is incorporated herein by reference. The halogenated hydroxy-diphenyl ethers useful in the present invention are represented by the formula $$R^1-\underset{R^2}{\underset{|}{\bigcirc}}-O-\bigcirc-R \quad (R^3)_n \quad \text{(I)}$$

$$\text{OH}$$

wherein R is a member selected from the class consisting of chlorine and bromine; $R^1$ is a member selected from the class consisting of chlorine and bromine; $R^2$ is a member selected from the class consisting of hydrogen, chlorine and bromine; $R^3$ is a member selected from the class consisting of hydrogen, chlorine, bromine and (lower) alkyl; and $n$ is one of the integers 1 and 2.

The preferred anti-microbial agents incorporated into the hard surface polishing and/or cleaning compositions of the present invention are represented by the formula $$R^4-\bigcirc-O-\bigcirc-R^6 \quad \text{(II)}$$
$$R^5 \quad \text{OH}$$

wherein $R^4$ is a member selected from the group consisting of chlorine and bromine; $R^5$ is a member selected from the group consisting of chlorine and bromine; and $R^6$ is a member selected from the group consisting of hydrogen and chlorine.

The preferred compound is one according to Formula II wherein each of $R^4$, $R^5$ and $R^6$ is chlorine.

The hard surface polish compositions of our invention contain as the main ingredients (percent by weight of solids):

| Constituent: | Proportion |
|---|---|
| (A) Acrylic based water-insoluble polymer or copolymer (film former) | 5–90 |
| (B) Alkali-soluble or wax-soluble resin | 0–90 |
| (C) Wax | 0–95 |
| (D) Emulsifying (or dispersing) agents, plasticizers | 0.5–25 |
| (E) Anti-microbial agent | 1–20 |
| (F) Water to make total solids of 10 to 50% by weight in composition. | |

The amount of alkali-soluble or wax-soluble resin present may be from about 0% to about 100% by weight of the acrylic based water-insoluble polymer or copolymer, preferably from about 10 to about 50% by weight. If a wax is present in the composition its content preferably should not exceed 40% by weight of the acrylic based water-insoluble polymer or copolymer and it is preferably employed in the range of about 0.3 to about 10% by weight of the acrylic based water-insoluble polymer or copolymer. However, the wax content may exceed 50% by weight of the water-insoluble polymer or copolymer where a high wax buffable polish is desired. The plasticizer is employed in a amount from about 0% to about 100% by weight of the acrylic based water-insoluble polymer or copolymer, preferably about 5 to about 75% by weight. The emulsifying and/or dispersing agent(s) is present to perform its well known function and as is customary in this art is present in amount sufficient to form a stable emulsion of the film former in the aqueous vehicle. The amount of emulsifying and/or dispersing agent is generally from about 0.057 to about 2% by weight of the acrylic based water-insoluble polymer or copolymer where no wax is present in the formulation. As high as 50% by weight of emulsifying and/or dispersing agent, based on weight of acrylic based water-soluble polymer or copolymer, may be used where a substantial amount of wax is present in the formulation.

The antimicrobial agents of the present invention embraced by Formula I are employed in the composition in a minimum concentration of 0.5% by weight of the total weight of the floor polish formulation, the preferred range being about 0.75 to about 2.5% by weight. However, higher concentrations may be used.

The preferred floor polish compositions of the present invention contain about 10% to about 25% by weight solids wherein the solids comprise at least 60% by weight of the acrylic based water-insoluble polymer or copolymer and about 1 to 15 percent by weight of the anti-microbial agent.

The waxes that are useful in the formulations of the present invention include animal, vegetable, mineral and synthetic waxes and wax-like materials. These waves are all well known in this art and include: bees wax, microcrystalline, oxidized microcrystalline, paraffin, montan, ceresin, ozokerite, chinese wax, bayberry, spermoceti, carnauba, candelilla, oricury, palm, whale, ceresin, stearic acid, sugar cane, esparto, lanolin, polyethylene, (e.g. oxidized polyethylenes, carboxylated polyethylenes, crystalline polyethylenes, etc.) and telomers of ethylene with saturated organic compounds containing only carbon, hydrogen and oxygen, e.g. an alcohol, aldehyde, ketone, acid, ester, orthoester, acid anhydride, ether or acetal as disclosed in U.S. Pat. No. 2,395,292.

Certain emulsifiable low molecular weight polyethylene waxes are preferred for use in an optically clear or "see through" polish formulation. Examples of such waxes are those commercially available under the trade names "AC-392" and "AC-394." These type of waxes which are already emulsified have a molecular weight in the range of about 1500 to 3500 and a density of about 0.99.

The wax soluble and alkali-soluble resins include those that are well known in the art for incorporation into floor polish and/or cleaning compositions. Illustrative of such resins are copolymers of styrene with at least one $\alpha$-$\beta$ monoethylene unsaturated acid or anhydride such as styrene-acrylic acid resins, or styrene-maleic anhydride resins; shellac, manila gum, loba gum, wood rosin, terpene-phonolic resins, tall oil rosin; alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids. Examples of dicarboxylic acids include maleic, fumaric, adipic, sebacic, etc. The polyhydric alcohols include glycerol, pentaerythritol, diethylene glycol and triethylene glycol; rosin-maleic anhydride adducts modified with polyols and rosin-fumaric acid adducts modified with polyols. The alkali-soluble resin is generally added to the polish formulation as a resin cut which is an aqueous alkaline solution obtained by solubilizing the alkali-soluble resin with an alkali substance such as ammonium hydroxide.

The preferred resins are the low molecular weight styrene-maleic anhydride copolymers. These materials are commercially available under the designation "SMA" resins. Such materials have the following properties: molecular weight from about 1600 to about 2500; a melting range from about 115°–155° C.; an acid number from about 220 to about 275; a viscosity of about 24 to 52 (cps.) in aqueous ammonia solution (15% solids) and ratio of styrene:maleic anhydride of 1:1 to 4:1, preferably 1:1 to 3:1.

The monomers used to prepare the acrylic polymers or copolymers are acrylic-type monocarboxylic acids and acrylic type esters. Acrylic type esters mean either methacrylic or acrylic. Among the useful acrylic-type esters are the straight and branch chain aliphatic acrylates and methacrylates having from 1 to 18 carbon atoms in the aliphatic group. Illustrative are ethyl acrylate, butyl acrylate, 2-ethyl hexyl acrylate, butyl methacrylate, ethyl methacrylate, methyl methacrylate, alkyl metacrylate crotyl acrylate, crotyl methacrylate, ethallyl acrylate, dimethacrylate. Other useful esters are listed in the prior art such as U.S. Pat. 3,308,078. Other acrylic-type esters are also contemplated such as aliphaphenyl acrylate, alkyl alpha chloroacrylate, glyceryl diacrylate, glycol diacrylate, etc. The acrylic type monocarboxylic acids are preferably acrylic acid and methacrylic acid.

The acrylic based polymers or copolymers used in the compositions of the present invention may contain up to about 25% by weight of a non-acrylic component such as styrene, lower alkyl substituted styrene (e.g. methyl styrene, ethyl styrene, etc.), itaconic acids.

The preferred acrylic system is an all acrylic copolymer such as one based on the reaction of acrylic acid with a lower alkyl methacrylate (e.g. methyl methacrylate) and a lower alkyl acrylate (e.g. butyl acrylate). These systems and their method of preparation for use in floor polishing compositions are known in the art such as represented by Canadian Pat. 868,423, the disclosure of which is incorporated herein by reference.

Among the emulsifying and dispersing agents that are useful for dispersing the film former in the aqueous vehicle, the following are well known and customarily used in this art: 2-pyrrolidone, triethanolamine, morpholine salts of fatty acids of 12–18 carbon atoms such as morpholine oleate and stearate. Acetates of n-primary amines having 12–18 carbon atoms in amine chain such as n-dodecyl amine acetate, n-octadecyl amine acetate, n-octadecenyl amine acetate and n-octadecadienyl amine acetate. Monoesters of polyethylene glycols and fatty acids of 12–18 carbon atoms such as hexaethylene glycol monoleate, alkylated aryl polyether alcohols, alkali metal soaps of fatty acids of 12–18 carbon atoms, soaps of alkalis such as alkanolamines, borax, morpholine, ammonia, alkali metals, and the like with acids such as oleic acid, red oil, mixed amino fatty acids, di-n-octyl sodium sulfosuccinate, oleic acid condensate of polyethylene oxide, sodium salt of a secondary alkyl sulfate, aryl alkyl polyether alcohols, aryl polyether alcohols. The emulsifier may be built into the wax component or it may be added as a separate component to the polish formulation.

The plasticizers used are well known materials and in many cases also function as leveling agents (i.e. cause a leveling of the film). Suitable plasticizers include tributoxy ethyl phosphate, diacetin, diethylene glycol, diacetate, tricresyl phosphate, dibutyl phthalate, butyl phthalyl butyl glycolate, methyl phthalyl ethyl glycolate, trimethylene glycol di-2-ethyl hexoate, trimethylene glycol - di - 2-ethyl butyrate, etc.

The floor polishing and/or cleaning compositions of the present invention have a pH in the range of about 7.5 to about 9.5.

Other conventional ingredients may be incorporated into the polishing and/or cleaning compositions of the present invention including bleaching agents (e.g. sodium meta bisulfite), dyes, etc.

The following examples in which the parts and percentages are by weight are illustrative of the invention.

EXAMPLE 1

The procedure for preparing the floor polish formulation is as follows:

(a) Resin solution 80 parts by weight hot water is heated in a stainless steel vessel to 130° F. and about 2.25 parts by weight of aqua ammonia (28–30%) are added with agitation followed by the addition of 15 parts by weight of "SMA-2625-A" resin. When all the resin has been added an additional 2.25 parts by weight of the ammonia are added and agitation of the solution is continued until all the resin is dissolved. The temperature during this operation of preparing the resin solution is maintained between 130 and 140° F. After the resin is dissolved the solution is cooled. The resin solution contains 15% by weight total solids and has a pH in the range of 9.4–9.7 and a color 0.8 (Gardner).

(b) Wax emulsion

A pressure kettle is charged with 18.03 parts by weight "AC-394," 5.62 parts by weight "Triton X-100," 1.38 parts by weight potassium hydroxide (flake 90–92%), 0.17 part by weight sodium metabisulfite, dry (purified) and 37.40 parts by weight water. This mixture is stirred and heated to 203° F. with agitation. Stirring is continued for about 30 minutes at 302°–311° F. Another 37.4 parts by weight of water preheated to 203° F. is added to the pressure kettle with agitation and then the mixture is cooled rapidly while stirring. The wax emulsion contains about 25% solids, and has a pH between 8.5–9.0.

(c) Preparation of floor polish formulation

In a stainless steel mixing tank the ingredients identified as (1) through (7) and (10) below, are added consecutively with good agitation, the antimicrobial agent having been first dissolved in the dipropylene glycol monomethyl ether. The mixture of ingredients is stirred for about 15 minutes, followed by the addition of 1.784 parts by weight of the wax emulsion prepared as previously described and 0.15 part by weight of formaldehyde (37%). The mixture is stirred for 15 minutes followed by the addition of 0.892 part by weight of aqua ammonia. Agitation is continued for an additional 40–45 minutes. The resulting floor polish formulation is filtered through a suitable 50 micron filter to remove impurities. The floor polish formulation has the following properties: Total solids—19.79 percent; pH—8.7–9.1; sp. gr. 20/20° C.—1.0404; final clarity with light—minimum 500 kopke; final clarity without light—minimum 250 kopke; final color—1.5 (Gardner Delta-212).

| Component: | Percent by weight |
|---|---|
| (1) Water | 40.813–39.813 |
| (2) Sodium meta bisulfite, dry | 0.119 |
| (3) "Rhoplex B–505" (40% solids) | 35.679 |
| (4) "SMA-2625A" resin solution | 11.893 |
| (5) Dipropylene glycol monomethyl ether | 5.847 |
| (6) Caprolactam | 1.189 |
| (7) Tributoxy ethyl phosphate | 1.784 |
| (8) "AC-394" polyethylene wax emulsion | 1.784 |
| (9) Aqua ammonia (28–30% NH$_3$) | 0.892 |
| (10) 2,4,4'-trichloro - 2 - hydroxy-diphenyl ether | 0.50 |

EXAMPLE 2A

A clear acrylic based polish composition is prepared as in Example 1 containing 30% solids having the following ingredients:

| Component: | Parts by weight |
|---|---|
| Water | 19.9 |
| Sodium meta bisulfite, dry | 0.238 |
| "Rhoplex B–505" (40% solids) | 71.358 |
| "SMA-2625A" resin solution | 19.158 |
| Dipropylene glycol monomethyl ether | 11.694 |
| Caprolactam | 2.378 |
| Tributoxy ethyl phosphate | 3.568 |
| "AC-394" polyethylene wax emulsion | 3.568 |
| Aqua ammonia | 1.784 |
| 2,4,4'-trichloro-2'-hydroxy-diphenyl ether | 1.50 |

EXAMPLE 2B

Another typical all acrylic based "see through" polish formulation is prepared containing the following ingredients:

| Component: | Parts by weight |
|---|---|
| (1) Water | 41 |
| (2) "SMA 2625A" (15% solids) | 30 |
| (3) "Crilicon 642" (40% solids) | 24 |
| (4) Caprolactam | 1.5 |
| (5) Carbitol | 1.5 |
| (6) Tributoxyethyl phosphate | 1.0 |
| (7) "AC-394" polyethylene emulsion (15% solids) | 5.0 |
| (8) "FC-128" (1% solids) | 0.5 |
| (9) Aqua ammonia, to pH 8.6–8.8. | |
| (10) Antibacterial agent of Example 1 | 0.75 |

The water is heated to about 160–180° F. and charged into a tank. To the water is added component (2) followed by component (3). Thereafter components (4), (5), (6) and (8) are added and the pH adjusted to 8.6–8.8 after which the "AC–394" polyethylene emulsion is added and the solution stirred until it is clear, with component (10) having been predissolved in component (5).

EXAMPLE 2C

A translucent polish formulation may be prepared containing the following ingredients:

| Component: | Parts by weight |
|---|---|
| (1) "Crilicon 642" (15% solids) | 85 |
| (2) Pentaerythritol solution (15% solids) | 10 |
| (3) "AC-540" polyethylene emulsion (15% solids) | 5 |
| (4) Tributoxyethyl phosphate | 0.9 |
| (5) Carbitol | 2.5 |
| (6) 2-pyrrolidone | 0.5 |
| (7) "FC-128" (1% solids) | 0.5 |
| (8) Aqua ammonia, to pH 8.2–8.5. | |
| (9) Antibacterial agent of Example 1 | 0.75 |

This formulation is prepared in the same manner as described in Example 2.

EXAMPLES 3(A) AND 3(B)

A series of floor polish formulations are prepared as in Example 1 containing the same ingredients but varying the proportion of 2,4,4'-trichloro - 2' - hydroxy-diphenyl ether as follows:

| | Percent by weight |
|---|---|
| 3(A) | 0.25 |
| 3(B) | 1.00 |

EXAMPLE 4

Another clear acrylic floor polish is illustrated by the following formulation:

| Component: | |
|---|---|
| Water parts by weight | 63.3 |
| "SMA 2625A" do | 4.5 |
| Caprolactam do | 3.0 |
| Ammonium hydroxide (28% ammonia) do | 1.7 |
| Tributoxy ethyl phosphate parts by volume | 1.8 |
| FC-128 (1% solids do | 0.5 |
| "Crilicon WW–100L" do | 25.3 |
| 2,4,4'-trichlor-2'-hydroxydiphenylether do | 0.75 |

EXAMPLES 5(A) AND 5(B)

Other clear acrylic polishes are illustrated by the following formulations.

(A)

| Component: | Parts by weight |
|---|---|
| Water | 50.00 |
| "SMA–1725A" solution (15% solids) | 20.00 |
| "Lucidene" (40% solids | 30.00 |
| Tributoxyethyl phosphate | 1.00 |
| 2-pyrrolidone | 0.50 |
| N-methyl-2-pyrrolidone | 0.80 |
| Carbitol | 4.00 |
| Anti-microbial agent of Example 1 | 1.00 |

Final pH is adjusted to 9.0–9.2.

(B)

| Component: | |
|---|---|
| "Richamer R-800" (18% solids) | 70.00 |
| "SMA-1725" (18% solids) | 30.00 |
| Tributoxyethyl phosphate | 2.1 |
| Carbitol | 4.8 |
| Anti-microbial agent of Example 1 | 1.8 |

EXAMPLE 6

A high wax, buffable polish is illustrated by the following formulation:

| Wax emulsion at 30%: | Parts by weight |
|---|---|
| "Efton D Super" | 50.0 |
| "AC-540 polyethylene | 50.0 |
| "Emulphor ON-870" | 5.0 |
| Refined tall oil fatty acid or oleic acid | 3.0 |
| Potassium hydroxide at 48% | 5.0 |
| Ethyl amino ethanols #161 | 5.0 |
| Water at 200° F. | 245.0 |
| Polish formulation: | |
| Wax emulsion at 14% | 60.0 |
| "SMA-2625A" at 14% | 20.0 |
| Tributoxyethyl phosphate | 0.5 |
| Carbitol | 1.0 |
| "FC-128" (1% solids) | 1.0 |
| Anti-microbial agent of Example 1 | 0.75 |

EXAMPLE 7

A floor polish formulation according to Example 1, containing various concentrations (0.0–1%) of 2,4,4'-trichloro-2'-hydroxy-diphenyl ether, is tested to determine its anti-microbial action as follows: 0.03 ml. of the polish formulation was applied to 1⅛" x 1⅛" tiles (equivalent to 2 ml. on 9" x 9" tiles). These squares were subsequently tested according to AATCC Test Method 90-1965 (Zone of Inhibition Test). The refrigeration option indicated in the test method was not employed. The results are indicated in Table I below:

TABLE I

| | Zone of inhibition (mm.) | | | | | |
|---|---|---|---|---|---|---|
| | Asphalt | | Vinyl | | Vinyl asbestos | |
| Percent anti-microbial agent | S. aureus | E. coli | S. aureus | E. coli | S. aureus | E. coli |
| 0.0 | 0 | 0 | 0 | 0 | 0 | 0 |
| 0.1 | 0 | 0 | 0 | 0 | 0 | 0 |
| 0.25 | 0 | 2 | 0 | 0 | 0 | 1 |
| 0.50 | 2 | 4 | 0 | 3 | 3 | 4 |
| 0.75 | | | 4 | | | 2–3 |
| 1.00 | 6 | 6 | 4 | 4 | 4 | 6 |
| Unwaxed tile | 0 | 0 | 0 | 0 | 0 | 0 |

The results indicate that a minimum concentration of 0.5% of anti-microbial agent is necessary to achieve bacteriostatic activity.

Floor wax polishes as described in Example 1 are prepared replacing the 2,4,4'-trichloro-2'-hydroxy-diphenyl ether with N-alkyl dimethyl benzyl ammonium cyclohexyl sulfamate (80% in water) at concentrations ranging from 0.0–0.50% by weight. 0.5 ml. of the formulation were added to 1" square sterile filter paper and rubber tile, allowing them to dry completely. Residual bacteriostatic activity was measured against Staph. aureus and E. coli. The results are reported in the table below.

TABLE II

| Surface | Sterile (s)/nonsterile (NS) | 0 to 0.50% antimicrobial agent | Zones of inhibition (mm.) | |
|---|---|---|---|---|
| | | | S. aureus | E. coli |
| Filter paper | S | 0 | No zones | No zones. |
| Do | S | 0.5 | do | Do. |
| Rubber tile | S | 0 | do | Do. |
| Do | S | 0.5 | do | Do. |
| Do | NS | 0 | do | Do. |
| Do | NS | 0.5 | do | Do. |

EXAMPLE 8

Tests were conducted to demonstrate the long-lasting antimicrobial activity of the floor polish formulation of Example 1 containing 0.50% of the anti-microbial agent as follows:

9" x 9" vinyl asbestos tiles were coated with 1 cc. of a polish formulation containing 0.50% of the anti-microbial composition of Example 1. Four of these tiles (sample a) were examined for zones of inhibition as previously described under actual use conditions at 700 passes/day for 13 days and the other four tiles (sample b) which were not subjected to traffic were also examined for zones of inhibition after 13 days. The average results are shown below in the table.

TABLE III

| | Percent antimicrobial agent | Zones of inhibition (mm.) | |
|---|---|---|---|
| | | S. aureus | E. coli |
| Sample— | | | |
| a | 0.50 | Trace | 1 |
| b [1] | 0.50 | 2 | 2 |

[1] Control—not walked on.

EXAMPLE 9

Tile coated with the polish formulation of Example 1 containing 0.50% by weight active ingredient and subjected to 13 days traffic as described in the previous example after which it was washed with water and commercial floor cleaners. The results are reported below:

TABLE IV

| | Percent antimicrobial agent | Wash product used | Zones of inhibition (mm.) | |
|---|---|---|---|---|
| | | | S. aureus | E. coli |
| Sample— | | | | |
| 1 | 0.50 | Spic & Span [1] | 1 | 2 |
| 2 | ([2]) | do.[1] | 0 | 0 |
| 3 [3] | 0.50 | do.[1] | 2 | 3 |
| 4 | 0.50 | Top Job [4] | 1 | 2 |
| 5 | ([2]) | do.[4] | 0 | 0 |
| 6 [3] | 0.50 | do.[4] | 3 | 3 |
| 7 | 0.50 | Water | 1 | 1 |
| 8 | ([2]) | do | 0 | 0 |
| 9 [3] | 0.50 | do | 2 | 2 |

[1] ½ cup to 2 gallons of water (approx. 1.4%) Spic & Span (Proctor & Gamble).
[2] None.
[3] No traffic (control), only washed.
[4] ¼ cup to 1 gallon of water (approx. 1.5%) Top Job (Proctor & Gamble)

EXAMPLE 10

The performance qualities of the floor polish of Example 1 were tested containing various concentrations of the anti-microbial agent used in that example. The results are shown below.

TABLE V

| Percent antimicrobial agent | Gloss [1] (black vinyl tile) | Levelling | Powdering |
|---|---|---|---|
| 0 | 87 | Excellent | None. |
| 0.1 | 86 | do | Do. |
| 0.5 | 87 | do | Do. |
| 1.0 | 88 | do | Do. |

[1] Gardner portable glossmeter 60° angle.

EXAMPLE 11

The aging qualities of the formulation of Example 1 was determined at various concentrations of the antimicrobial agent. The clarity was determined by a modified kopke method. The results are reported in the following table:

TABLE VI

| Antibacterial agent (percent) | Clarity | | | Separation | | |
|---|---|---|---|---|---|---|
| | R.T. °F. | 100° F. | 130° F. | R.T. °F. | 100° F. | 130° F. |
| 0.0 | Clear | Clear | Clear | None | None | None. |
| 0.5 | do | do | do | do | do | Do. |
| 1.0 | do | do | do | do | do | Do. |

EXAMPLE 12

The composition of Example 1 was prepared substituting various well-known germicidal agents for the one set forth in that example. The anti-microbial action was determined in the manner set forth in Example 7. The results which are the average of triplicate tests are reported below:

TABLE VII

| Antimicrobial agent (percent active) | Percent in formula | Zone of inhibition (mm.) | |
|---|---|---|---|
| | | Vinyl asbestos, S. aureus | Vinyl, E. coli |
| Formyldehyde (37%) | 2.03 | 0 | 0 |
| Onyx 172 [1] (80%) | 0.94 | 0 | 0 |
| Cosan 635 WE [2] (100%) | 0.75 | 0 | 0 |
| Santophene #1 [3] solution (75%) | 1.00 | 0 | 0 |

[1] N-alkyl dimethyl benzyl ammonium cyclohexyl sulfamate.
[2] Mixture of caprylamine, laurylamine, palmitylamine, stearyl amine and other alkyl amine complexes.
[3] Orthobenzyl parachlorophenol.

The following is the presently available description of the products identified by trade name in the examples:

(a) "SMA Resin 1725 A"—styrene-maleic anhydride copolymer; molecular weight 2200; melting range 140–155° C.; acid number 260; styrene: maleic anhydride ratio 2:1.

(b) "SMA Resin 2625 A"—styrene-maleic anhydride copolymer molecular weight 1900; melting range 135–160° C.; acid number 220; styrene: maleic anhydride ratio 2:1.

(c) "Rhoplex B-505"—anionic zinc cross-linked aqueous acrylic copolymer containing 40% solids and having a pH of 7.5–8, the copolymer composed of the monomers acrylic acid, methyl methacrylate and butyl acrylate; hardness of 14–16.

(d) "Crilicon WW-100L"—anionic zinc cross-linked acrylic copolymer having a pH of 8.4–8.8; viscosity 100 cps.

(e) "Crilicon 642"—anionic zinc cross-linked acrylic copolymer; pH of 7.2–8.2; viscosity 100 cps.

(f) "Lucidene"—acrylic copolymer available from Morton Chemical Co.

(g) "Richamer R-800"—is a metal cross-linked acrylic polymer that becomes transparent with addition of ammonia to pH 8.5–9.5.

(h) "Efton D Super"—is a mildly oxygenated, 100% synthetic Fischer-Tropsch hydrocarbon hard wax having a melting point of 210–215° F.; acid value 8–12; saponification value 16–24; hydroxyl value 9–10.

(i) "Emulphor ON-870"—a non-ionic polyoxyethylated fatty alcohol surfactant.

(j) "AC-540" is a copolymer of polyethylene and acrylic acid having a softening point of 226° C.; a hardness (dmm.) of 2.0; a density of 0.93 (g./cc.); a viscosity of 500 (cps. at 140° C.); acid number of 40; molecular weight of 3,500.

(k) FC-128–a fluorocarbon available from 3M Company.

(l) "AC-392" is an emulsifiable polyethylene wax having a softening point of 280° F.; a hardness of <0.5 (dmm.); a density (g./cc.) 0.99; a viscosity of 9000 cps. (at 300° F.); acid number of 28, and a molecular weight of 1500.

(m) "AC-394" is an emulsifiable polyethylene wax having a softening point of 272° F.; a hardness of <1 (dmm.); a density (g./cc.) of 0.99; a viscosity of 3,000 cps. (at 300° F.); an acid number of 50–60; and a molecular weight of 3500.

(n) "Triton X-100" — octyl phenoxy polyethoxy ethanol.

What is claimed is:

1. An aqueous floor polish composition comprising (a) about 10 to 90% by weight of an acrylic-based water-insoluble film former based on the total weight of the solids in said composition, said acrylic based film former being a polymer containing (1) at least one monomer selected from the class consisting of alkyl acrylate and a lower alkyl methacrylate and (2) at least one monomer selected from the class consisting of acrylic acid and methacrylic acid; (b) 0 to 90% by weight of an alkali-soluble resin based on the total weight of solids in said composition; (c) up to 100% by weight of a plasticizer based on the weight of said water-insoluble film former; (d) 0 to about 40% by weight of an emulsifiable wax based on the weight of said acrylic based water-insoluble film former; (e) 0 to 50% by weight of an emulsifier based on the weight of said water-insoluble film former; (f) at least 1% by weight of the compound having the formula:

$$R^5 \text{—} \underset{R^6}{\bigcirc} \text{—} O \text{—} \underset{OH}{\bigcirc} \text{—} R^4$$

wherein $R^4$ is a member selected from the group consisting of chlorine and bromine; $R^5$ is a member selected from the group consisting of chlorine and bromine; $R^6$ is a member selected from the group consisting of hydrogen and chlorine based on the weight of the solids in said aqueous floor polish composition; and (g) a compound from the group consisting of dipropylene glycol monomethyl ether and diethylene glycol monoethyl ether.

2. An aqueous floor polish composition according to claim 1 wherein said alkali soluble resin is a styrene-maleic anhydride copolymer, said copolymer having a molecular weight between about 1600 and about 3500, the ratio of styrene to maleic anhydride being about 1:1 to 3:1.

3. An aqueous floor polish composition according to claim 2 wherein said wax is an emulsifiable polyethylene wax.

4. An aqueous floor polish composition according to claim 3 wherein said emulsifiable polyethylene wax is present in an amount between 0.3 and 10% by weight of said water-insoluble film former and said wax is characterized by having a molecular weight between about 1500 and about 3500, a hardness of less than 1 and a density of about 0.99.

5. A clear aqueous floor polish formulation consisting essentially of from about 10 to about 25% by weight of solids based on the total weight of the composition, wherein said solids consist essentially of (a) 60% by weight of an acrylic based water insoluble film former, said film being a polymer containing (1) at least one monomer selected from the class consisting of a lower alkyl acrylate and a lower alkyl methacrylate, (2) at least one monomer selected from the class consisting of acrylic acid and methacrylic acid; (b) about 10 to about 50% by weight of a resin based on the weight of said acrylic based water-insoluble film former present in said polish formulation, said resin consisting essentially of a styrene-maleic anhydride copolymer, said copolymer having a molecular weight between about 1600 and 2500, a melting range from about 115°–155° C., an acid number between 220 and 275, the styrene to maleic anhydride ratio being about 1:1 to 3:1; (c) about 5 to about 75% by weight of at least one plasticizer based on the weight of said acrylic based water-insoluble film former; (d) at least 1% by weight of the compound having the formula:

$$R^5 \text{—} \underset{R^6}{\bigcirc} \text{—} O \text{—} \underset{OH}{\bigcirc} \text{—} R^4$$

wherein $R^4$ is a member selected from the group consisting of chlorine and bromine; $R^5$ is a member selected from the group consisting of chlorine and bromine and $R^6$ is a member selected from the group consisting of hydrogen and chlorine and (e) a compound selected from the group consisting of dipropylene glycol monomethyl ether and diethylene glycol monoethyl ether.

6. A clear aqueous floor polish formulation according to claim 5 which additionally includes about 0.3 to about 10% by weight of an emulsifiable polyethylene wax, said wax having a density of 0.99, an acid number of 28 to 60, a molecular weight of about 1500 to 3500 and a hardness of less than 1.

7. A clear aqueous floor polish formulation according to claim 6 wherein said acrylic based, water-insoluble film former is an all acrylic cross-linked copolymer composed of the monomers butyl acrylate, methyl methacrylate and acrylic acid.

8. A clear aqueous floor polish formulation according to claim 7 wherein said ratio of styrene to maleic anhydride is 2:1, the molecular weight of said styrene-maleic anhydride copolymer is about 1900 and the acid number of said styrene-maleic anhydride copolymer is about 220.

References Cited
UNITED STATES PATENTS

| | | | |
|---|---|---|---|
| 2,483,296 | 12/1969 | Martin et al. | 106—15 AF |
| 2,970,081 | 1/1961 | McCall et al. | 106—10 |
| 3,467,610 | 9/1969 | Fiarman et al. | 260—28.5 R |
| 3,506,720 | 4/1970 | Model et al. | 106—15 AF |

MORRIS LIEBMAN, Primary Examiner

S. L. FOX, Assistant Examiner

U.S. Cl. X.R.

106—15 AF; 424—81